Feb. 27, 1945.  S. N. JUUL  2,370,316
AIRPLANE WHEEL
Filed Nov. 26, 1942  3 Sheets-Sheet 3
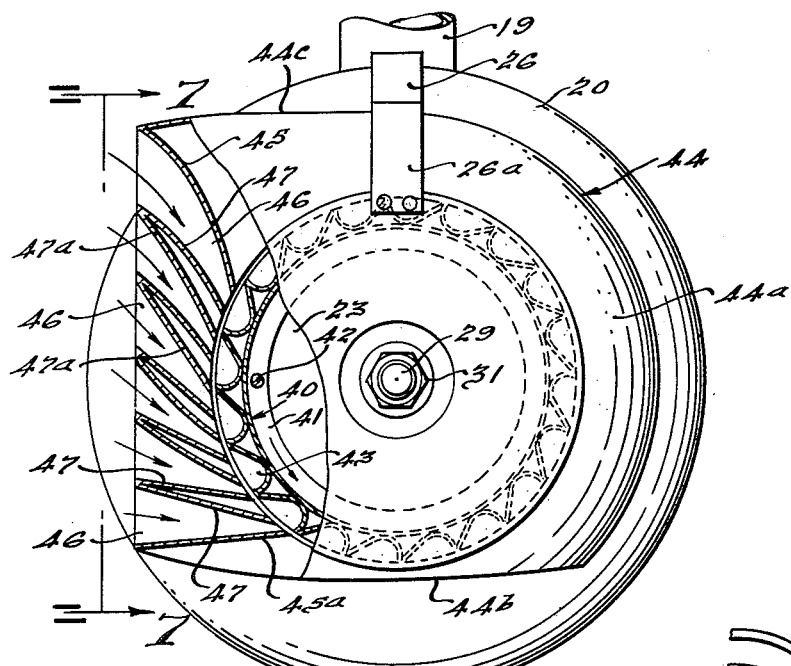
FIG. 6.
FIG. 7.
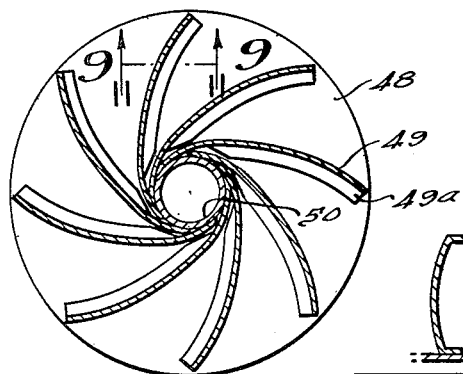
FIG. 8.
FIG. 9.
INVENTOR
Sorèn N. Juul.
BY
Gray & Smith
ATTORNEYS.

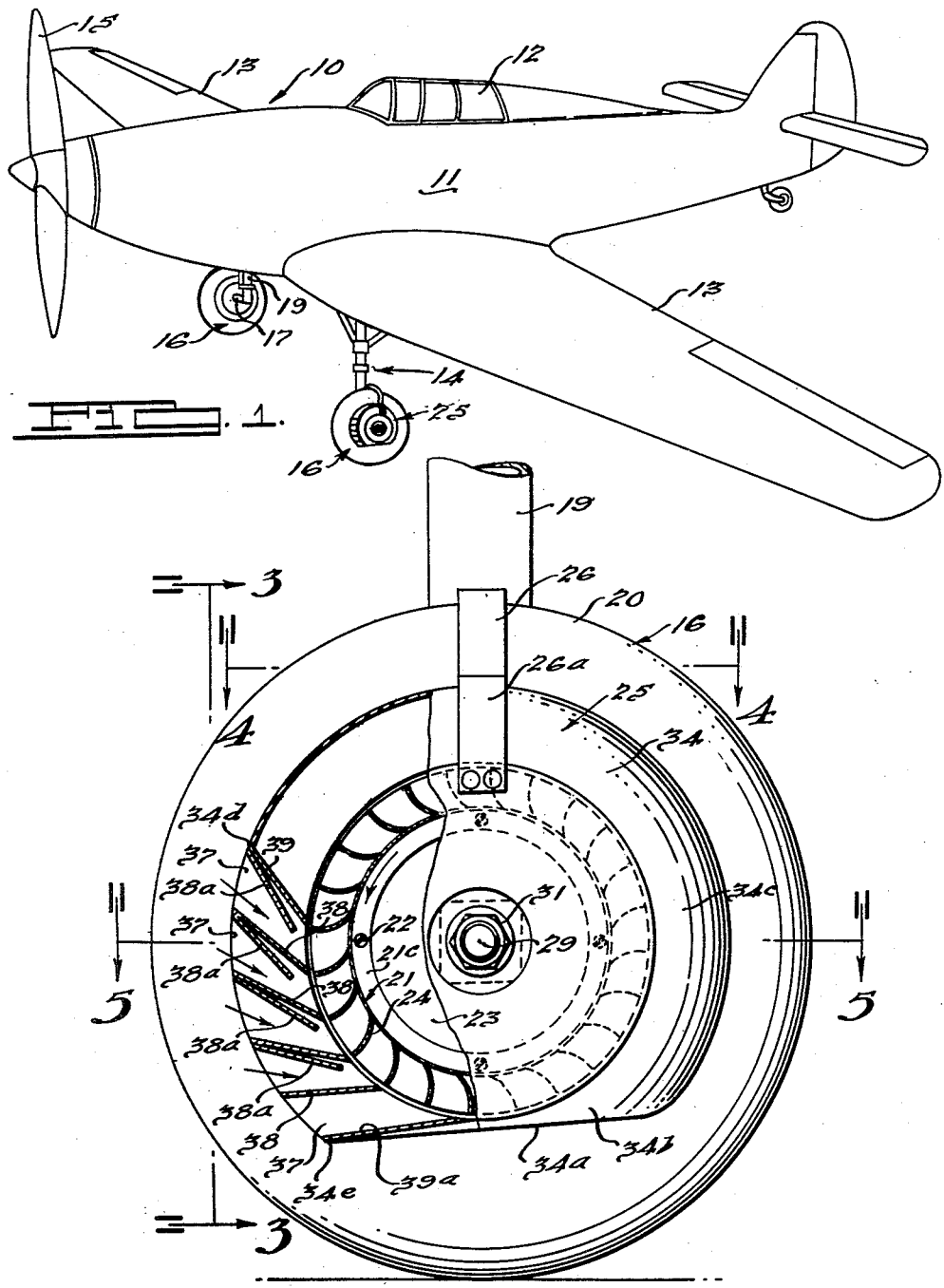

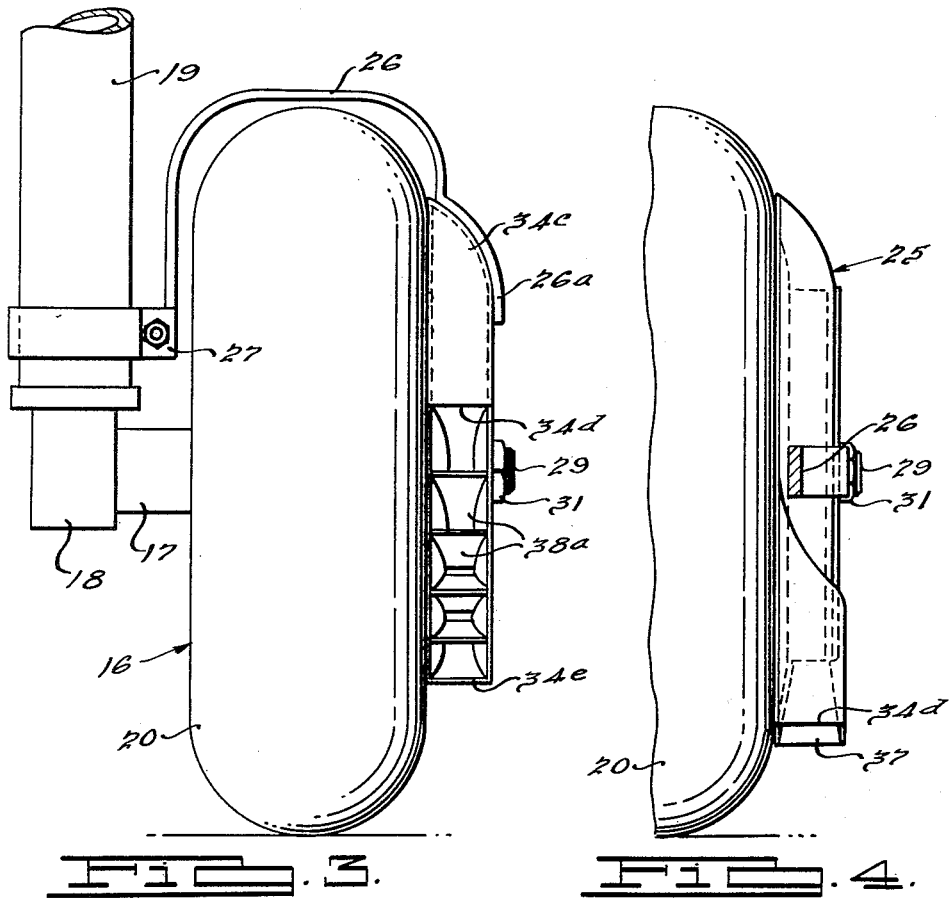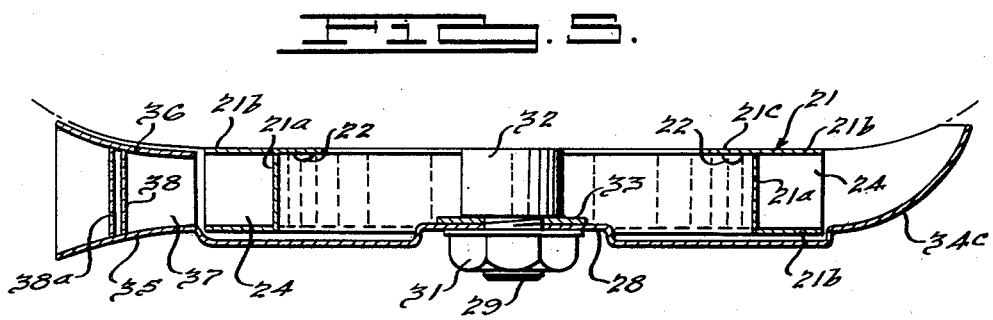

Patented Feb. 27, 1945

2,370,316

UNITED STATES PATENT OFFICE 2,370,316

AIRPLANE WHEEL

Soren N. Juul, Detroit, Mich., assignor to Briggs Manufacturing Company, Detroit, Mich., a corporation of Michigan Application November 26, 1942, Serial No. 467,007

11 Claims. (Cl. 244—103)

This invention relates to aircraft or airplanes and particularly to the landing gear thereof, the invention being especially directed to the provision of air-impelled or air-driven means on the landing wheels of the airplane designed and constructed to cause rotation or spinning of the wheels of the landing gear in a forward direction before impact of the wheels with the ground at the time of landing.

It is well known that when aircraft land at relatively high speed with the wheels substantially still and not rotating, frequently damage is caused to the tires by reason of their impact with the ground. This is particularly true with respect to the heavy type of aircraft such as bombers and transport planes. This condition produces great wear and tear on the tires causing occasional accidents due to blowouts at the time of landing. Such landing shock further materially lessens the life of the tires which at present upon aircraft of the heavy type is limited to but a few hundred miles of actual ground contact. These disadvantages are largely overcome by virtue of the present invention whereby means are provided on the wheels to rotate them rapidly in the proper direction during the landing operation of the airplane so as to reduce the frictional resistance of the tire when it makes contact with the ground.

It is an object of the invention to provide an airplane landing gear having wheels and improved means on said wheels projecting into the air stream and impelled thereby for rotating the wheels during the landing operation of the airplane.

Another object of the invention is to provide a landing gear for an airplane having improved wind-driven means associated with the landing gear and projecting into the air stream for rotating the wheels thereof during the landing operation of the airplane.

It is a further object of the invention to provide an airplane landing gear having wheels and means on said wheels projecting into the air stream and impelled thereby for rotating the wheels during the landing operation of the airplane, and a shield or cover partially enclosing said means to prevent counter-rotational effort of said air stream when such means are not utilized to rotate the wheels.

Another object of the invention is to provide a turbine device for rotating the airplane landing wheel in a forward direction, in which the stream of air is directed through passageways in the casing tangentially with respect to the impeller blades or vanes and wherein the casing is constructed to prevent back drag or counter-rotational effort tending to reduce the effectiveness of the turbine device.

A further object of the invention is to provide improved wind-driven impeller means of turbine type for rotating wheels affixed to the landing gear of an airplane thereby to materially reduce the normal frictional resistance between said wheels and the ground during the landing operation of the airplane.

A still further object of the invention is to provide a landing gear having wheels which are provided with wind-driven turbine devices including impellers or vanes constructed and arranged to produce rotation of said wheels in a forward direction by reason of the force of the air stream acting on the impellers or vanes during the landing operation of the airplane, the device being provided with a casing and fixed guide blades directing the stream of air to the impeller blades substantially tangentially with respect to the circumference of the impeller.

Other objects of this invention will appear in the following description and appended claims, reference being had to the accompanying drawings forming a part of this specification wherein like reference characters designate corresponding parts in the several views.

Fig. 1 illustrates an airplane having wheels constructed in accordance with the invention.

Fig. 2 is a side elevation partly in section of an airplane wheel having a device embodying the invention including a rotary impeller or vane supporting member and a turboshield member.

Fig. 3 is a front elevation taken substantially along the lines 3—3 of Fig. 2 looking in the direction of the arrows.

Fig. 4 is a section taken substantially through lines 4—4 of Fig. 2 looking in the direction of the arrows.

Fig. 5 is a section taken substantially through lines 5—5 of Fig. 2 looking in the direction of the arrows.

Fig. 6 is a side elevation, partly broken away and in section, of another embodiment of the invention.

Fig. 7 is a front elevation taken substantially through lines 7—7 of Fig. 6 looking in the direction of the arrows.

Fig. 8 is a sectional elevation of another form of impeller.

Fig. 9 is a detail section taken substantially through lines 9—9 of Fig. 8 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings there is shown in Fig. 1 an airplane generally indicated by the numeral 10 and comprising a main body portion or fuselage 11 having a passenger compartment 12. The wings 13 are secured to the fuselage in a manner well known in the art. Retractable landing gear 14 of any conventional type is secured to the wings 13 and is adapted to be retracted within a well or housing located within the understructure of the wings and fuselage. Within the front part of the fuselage there is a power plant compartment in which there is operatively arranged an internal combustion engine adapted to drive a screw propeller 15.

Suitable wheels generally indicated at 16 are located at the lower end of the landing gear 14 and are mounted to turn upon suitable axles 17 which are in turn secured to the lower end of shock absorber extensions 18 conventionally housed within the shock struts 19. Each wheel 16 is provided with a suitable hub assembly and a rim which is adapted to receive pneumatic tires 20. The tires may be of any construction suitable for aircraft, their size depending upon the size and weight of the airplane.

In accordance with the embodiment of the invention illustrated in Figs. 1 to 5 inclusive, there is provided an impeller 21 adapted to be rigidly mounted upon the landing wheel 16 and driven by the air stream for imparting rotative movement to the wheel in a forward direction just prior to landing. The impeller 21 comprises an annular channel shaped member having parallel sides 21b and a bottom wall 21a connecting the sides to form a channel. The inner side wall 21b is extended to provide an annular flange 21c which is adapted to be secured, as by means of screws 22, to the hub or disk 23 of the wheel. Mounted within the channel of the impeller, formed by the bottom and side walls 21a and 21b, are a series of impeller vanes or blades 24 which are equally spaced around the impeller channel and are curved in the manner shown particularly in Fig. 2 so as to obtain highly efficient propulsion action from the air stream. The impeller 21 is shielded or masked by means of a disk-like casing 25 which encloses the impeller and is provided with means, as hereinafter described, for directing the air stream in a predetermined manner against the impeller blades or vanes during forward travel of the airplane. The casing 25 is fixed against rotation being supported at its top from the shock strut 19 by means of a yoke-like bracket 26. This bracket has a curved extension 26a conforming to the curvature of the casing 25, as shown in Fig. 3, and secured thereto in any suitable manner. The bracket 26 extends around the top of the wheel, suitable clearance being provided to avoid contact of the wheel with the bracket, and the inner end is secured to a bracket 27 embracing the shock strut 19 and clamped thereto.

The casing 25 has a centrally located circular embossment 28 apertured to receive a threaded stud 29 projecting from the axle 17 upon which the wheel revolves. The casing is attached to this stud by means of a nut 31, a spacer 32 being interposed between a reinforcing washer 33 welded to the embossment 28 and an annular shoulder on the axle member 17.

As illustrated in the drawings, the casing is formed from a pressed metal disk 34 and is generally concave in shape so as to provide an inwardly curved portion 34c which extends close to the rim of the wheel to block off the flow of air toward the impeller except at predetermined points. The lower edge of the disk 34 is cut away along the line 34a generally tangentially with respect to the circumference of the impeller and the remaining portion of the disk at 34b is also curved inwardly close to the wheel so as to deflect air away from the impeller. The disk 34 is substantially entirely closed around its marginal edge against the inflow of air from the point 34d in its circumference to the point 34e. Thus, the disk provides substantially a closed chamber between the points 34d and 34e, the end of the chamber being closed at 34d by an inwardly extending wall 39 and the opposite end of the chamber at point 34e being closed by a wall 39a which extends tangentially with respect to the circumference of the impeller 21.

The forward portion of the casing between the points 34d and 34e is provided with a series of angularly related air passages 37, five being shown, by way of example, in Fig. 2. These passages are formed by means of end walls 39 and 39a and intermediate walls or blades 38, all of which extend in directions approximating tangents to the impeller 21. It will be seen that the adjacent walls or blades 38, 39 and 39a extend in somewhat converging relation and are spaced apart at their inner ends substantially in accordance with the spacing of the outer edges of the impeller vanes 24. In the present instance in order to increase the velocity of air directed through the passages 37 to the impeller vanes, there are provided additional guide blades or vanes 38a extending from the outer edges of the walls 38 and 39 and angularly with respect thereto. Referring to Fig. 5, it will be noted that the side walls 35 and 36 of the passages 37 diverge or flare outwardly so that in effect the passages 37 leading to the impeller vanes and formed by the guide blades 38 and 38a are Venturi passages producing an accelerated flow of air to the impeller for rotating the same during the forward travel of the airplane.

Referring to the embodiment illustrated in Figs. 6 and 7, in this instance the impeller 40 comprises an annular channel similar to the impeller 21 and having an annular flange 41 attachable by means of screws 42 to the disk or hub 23 of the wheel. In this embodiment the impeller vanes or blades 43 comprise a series of generally L-shaped members which are secured within the channel and provide a series of pockets with curved bottom walls facing in the direction of the incoming air stream. The casing 44 of this embodiment is in the form of a pressed metal plate with the rear portion 44a thereof dished or concave so that the marginal edge of the casing except at the front opening extends close to the wheel to prevent the inflow of air. The top and bottom edges 44b and 44c of the casing extend generally parallel in the direction of the air stream and the space between the forward ends of these portions provides an opening for the flow of air to the impeller. As in the previous embodiment, the casing 44 is in the form of a closed channel around the side of the wheel and the forward ends of the channel are closed by means of top and bottom walls 45 and 45a. These walls together with a series of intermediate blades 47 form air passages 46 at the front of the casing through which air may be directed to the impeller. As in the previous embodiment the flow of air through these passages may be accelerated by means of additional angularly related blades 47a which extend generally tangentially with respect to the circumference of the impeller.

In the embodiment illustrated in Figs. 8 and 9, the impeller comprises a disk 48 which may be secured to the disk or hub 23 of the wheel. The impeller blades or vanes comprise a series of members 49 secured at their inner ends to an annular hub 50 and curving outwardly toward the edge of the disk. The curved blades or vanes 49 extend tangentially with respect to the hub 50 and diverge outwardly providing generally V-shaped pockets adapted to rotate into the air streams flowing through the intake passageways 37 of the embodiment of Fig. 2, or the passageways 46 in the embodiment of Fig. 6.

From the foregoing it will be seen that the turbo-shield 34 or 44 provides passageways 37 or 46 formed by angularly related baffles for directing the stream of air into the impeller in directions substantially tangential thereto so that a downward force will be applied to each impeller vane or blade during its movement past the front opening in the shield. The principal forces are exerted below the center or axis of rotation of the wheel and downwardly in such manner as to induce rotation only in a forward direction. The shield is further constructed so as to mask the impeller around its periphery except at the front opening. This prevents counter-rotational effort of the air stream or air currents upon the vanes as they pass above the wheel axis. Thus, the air stream will have no effect on the impeller except to cause forward rotation of the wheel.

I claim:

1. Landing gear for an airplane having a wheel and a support therefor, comprising an impeller secured to a side of said wheel and having vanes, and a shield at said side of the wheel embracing said impeller and disposed within the wheel area, said shield having passageways for directing the air stream to the vanes in a direction only to exert forward rotational effort on the wheel, and means for mounting the shield on said wheel support in fixed position.

2. Landing gear for an airplane having a wheel and a support therefor, comprising an impeller secured to a side of said wheel and having vanes, and a shield at said side of the wheel embracing said impeller and disposed within the wheel area, said shield having passageways for directing the air stream substantially tangentially with respect to the impeller in a downward direction forwardly of the wheel axis, and means for mounting the shield on said wheel support in fixed position.

3. In an airplane, a landing wheel, an upright support for said wheel, an annular impeller secured to one side of the wheel and having vanes, a casing enclosing said impeller and having a front opening adapted to direct the air stream to the vanes to rotate the wheel in a forward direction when the airplane is landing, said casing being disposed within the wheel area, and means for securing said casing to said upright support.

4. In an airplane, a landing wheel, an upright support having an axle for said wheel, an annular impeller secured to one side of the wheel and having vanes, a casing enclosing said impeller and having a front opening adapted to direct the air stream to the vanes to rotate the wheel in a forward direction when the airplane is landing, said casing being disposed within the wheel area, and means for securing said casing to said upright support and to said axle.

5. In an airplane, a landing wheel, an upright support for said wheel, an annular impeller secured to one side of the wheel and having vanes, a casing enclosing said impeller and having a front opening provided with separate passageways adapted to direct the air stream to the vanes generally tangentially with respect to the impeller thereby to rotate the wheel in a forward direction when the airplane is landing, said casing being disposed within the wheel area, and means for securing said casing to said upright support.

6. In an airplane, a landing wheel, an upright strut having an axle for supporting the wheel, an annular impeller secured to one side of the wheel and having vanes, a casing enclosing said impeller and disposed within the wheel area at said side of the wheel, said casing having a front opening adapted to direct the air stream to the vanes to rotate the wheel in a forward direction when the airplane is landing, and means for securing said casing to said strut.

7. In an airplane, a landing wheel, an upright strut having an axle for supporting the wheel, an annular impeller secured to one side of the wheel and having vanes, a casing enclosing said impeller and disposed within the wheel area at said side of the wheel, said casing having a front opening adapted to direct the air stream to the vanes in a direction generally tangentially with respect to the impeller thereby to rotate the wheel in a forward direction when the airplane is landing, and means for securing said casing to said strut and to said axle.

8. In an airplane having a landing wheel, an annular impeller secured to one side of the wheel and projecting laterally therefrom, a casing having a greater area than the impeller enclosing the same and having its marginal edge extended inwardly into close proximity to the side of the wheel to provide a shield for the impeller, said casing being disposed within the area of the wheel and having a front opening for directing the air stream to the impeller.

9. In an airplane having a landing wheel, an upright strut supporting the wheel, an annular impeller secured to one side of the wheel and projecting laterally therefrom, a casing having a greater area than the impeller enclosing the same and having its marginal edge extended inwardly into close proximity to the side of the wheel to provide a shield for the impeller, said casing being disposed within the area of the wheel and having a front opening for directing the air stream to the impeller, and means for securing said casing to said strut.

10. In an airplane having a landing wheel, an upright strut carrying an axle for supporting the wheel, an annular impeller secured to one side of the wheel and projecting laterally therefrom, a casing having a greater area than the impeller enclosing the same and having its marginal edge extended inwardly into close proximity to the side of the wheel to provide a shield for the impeller, said casing being disposed within the area of the wheel and having a front opening for directing the air stream to the impeller, means for securing said casing to said strut, and means for securing the casing centrally thereof to said axle.

11. In an airplane, a landing wheel, strut means carrying an axle for revolubly supporting said wheel, an annular impeller secured to one side of the wheel and having vanes, a casing enclosing said impeller and having a front opening, said casing being disposed at said side of the wheel within the area of the latter, means for closing said casing around its margin except at said front opening, means associated with said opening for directing the air stream to the vanes to exert only forward rotational effort thereon, and means for securing said casing to said strut means and axle.

SOREN N. JUUL.